(12) United States Patent
Berggren et al.

(10) Patent No.: US 12,587,961 B2
(45) Date of Patent: Mar. 24, 2026

(54) REFERENCE SIGNAL IN DISCONNECTED MODE

(71) Applicant: Sony Group Corporation, Tokyo (JP)

(72) Inventors: Anders Berggren, Lund (SE); Rui Nunes, Lund (SE); Nafiseh Seyed Mazloum, Lund (SE); Basuki Priyanto, Lund (SE)

(73) Assignee: Sony Group Corporation, Tokyo (JP)

( * ) Notice: Subject to any disclaimer, the term of this patent is extended or adjusted under 35 U.S.C. 154(b) by 782 days.

(21) Appl. No.: 17/794,848

(22) PCT Filed: Feb. 8, 2021

(86) PCT No.: PCT/EP2021/052944
§ 371 (c)(1),
(2) Date: Jul. 22, 2022

(87) PCT Pub. No.: WO2021/160553
PCT Pub. Date: Aug. 19, 2021

(65) Prior Publication Data
US 2023/0084343 A1 Mar. 16, 2023

(30) Foreign Application Priority Data
Feb. 12, 2020 (SE) .................................... 2030047-1

(51) Int. Cl.
*H04W 4/00* (2018.01)
*H04L 5/00* (2006.01)
(Continued)

(52) U.S. Cl.
CPC ....... *H04W 52/0212* (2013.01); *H04L 5/0048* (2013.01); *H04W 76/28* (2018.02); *H04W 72/04* (2013.01)

(58) Field of Classification Search
None
See application file for complete search history.

(56) References Cited

U.S. PATENT DOCUMENTS

| | | | | |
|---|---|---|---|---|
| 10,050,729 B2 * | 8/2018 | Horiuchi | .............. | H04B 17/318 |
| 10,230,436 B2 * | 3/2019 | Liang | .................... | H04W 72/23 |

(Continued)

FOREIGN PATENT DOCUMENTS

| | | |
|---|---|---|
| CN | 107547187 A | 1/2018 |
| EP | 3520487 A1 | 8/2019 |

(Continued)

OTHER PUBLICATIONS

International Search Report and Written Opinion from corresponding International Application No. PCT/EP2021/052944, mailed on May 7, 2021, 16 pages.

(Continued)

*Primary Examiner* — Bob A Phunkulh
(74) *Attorney, Agent, or Firm* — Tucker Ellis LLP

(57) ABSTRACT

A method of operating a wireless communication device (101) includes, when operating in a connected mode (301), prior to a transition (309) to a disconnected mode (302, 303): receiving, from a communications network (100), at least one downlink message (4021, 4011) comprising configuration information indicative of at least one configuration of a sporadically-on transmission (900) of a reference signal (901, 4001). The method also includes, when operating in the disconnected mode (302, 303) in accordance with a discontinuous reception cycle (390): monitoring for the reference signal (901, 4001) sporadically transmitted by the communications network (100) in accordance with the at least one configuration. The reference signal (901, 4001) is suitable for maintaining synchronization in a further communication with the communications network (100) during an on-period (396) of the discontinuous reception cycle.

19 Claims, 9 Drawing Sheets

(51) Int. Cl.
  *H04W 52/02*    (2009.01)
  *H04W 76/28*    (2018.01)
  *H04W 72/04*    (2023.01)

(56) References Cited

U.S. PATENT DOCUMENTS

| | | | |
|---|---|---|---|
| 11,271,781 B2 * | 3/2022 | Herath | H04W 56/0045 |
| 2013/0259009 A1 * | 10/2013 | Berggren | H04L 5/0082 370/336 |
| 2018/0097598 A1 | 4/2018 | Ang et al. | |
| 2018/0254839 A1 * | 9/2018 | Yuan | H04B 7/046 |
| 2019/0059054 A1 | 2/2019 | Lee et al. | |
| 2019/0215896 A1 | 7/2019 | Zhou | |
| 2019/0254110 A1 * | 8/2019 | He | H04L 41/0896 |
| 2019/0306739 A1 * | 10/2019 | Kim | H04W 72/0453 |
| 2021/0409973 A1 * | 12/2021 | Berggren | H04W 24/02 |
| 2021/0409982 A1 * | 12/2021 | Koskela | H04W 76/15 |

FOREIGN PATENT DOCUMENTS

| | | | |
|---|---|---|---|
| WO | 2018064369 A1 | 4/2018 | |
| WO | WO-2018169808 A2 | 9/2018 | |
| WO | WO-2018203822 A1 | 11/2018 | |
| WO | 2019029711 A1 | 2/2019 | |
| WO | WO-2019028849 A1 | 2/2019 | |
| WO | 2019063819 A1 | 4/2019 | |
| WO | WO-2019215014 A1 | 11/2019 | |

OTHER PUBLICATIONS

Swedish Office Action and Search Report from corresponding Swedish Application No. 2030047-1, mailed on Dec. 8, 2020, 9 pages.

ZTE, "Discussion on potential techniques for UE power saving", 3rd Generation Partnership Project (3GPP) TSG RAN WG1 Meeting #96, R1-1902031, Feb. 25-Mar. 1, 2019, 22 pages.

Sony, "On TRS/CSI-RS occasion(s) for idle/inactive UEs", 3rd Generation Partnership Project (3GPP) TSG RAN WG1 #102e, R1-2005583, Aug. 17-28, 2020, 3 pages.

Mediatek Inc., "New WID: Ue Power Saving Enhancements," 3rd Generation Partnership Project (3GPP) TSG RAN Meeting #86, RP-193239, Dec. 9-12, 2019, 5 pages.

Qualcomm Incorporated, "Potential Techniques for UE Power Saving," 3rd Generation Partnership Project (3GPP) TSG-RAN WG1 #96, R1-1903016, Feb. 25-Mar. 1, 2019, 33 pages.

* cited by examiner

REFERENCE SIGNAL IN DISCONNECTED MODE

TECHNICAL FIELD

Various examples generally relate to sleep-mode operation of a wireless communication device. Various examples specifically relate to a transmission of a reference signal while the wireless communication device operates in the disconnected mode.

BACKGROUND

There is a need to reduce power consumption of wireless communication devices (UEs). One strategy to reduce power consumption of a UE is to operate the UE in a disconnected mode. As a general rule, the disconnected mode provides limited connectivity if compared to a connected mode, but enables a reduced power consumption. This is because data connection is deactivated, at least along a wireless link between the UE and the communications network. Then, the disconnected mode may include paging operation and/or random-access access, to re-establish the data connection. For example, in the context of the Third Generation Partnership Project (3GPP), example implementations of the disconnected mode include the Radio Resource Control (RRC) idle mode and RRC inactive mode.

As a general rule, when operating in a disconnected mode, the UE can expect transmissions from the communications network to be restricted to ON periods of a discontinuous reception (DRX) cycle; accordingly, during Off periods of the DRX cycle, the UE can transition some parts of its wireless interface into an inactive state (sometimes also called sleep state). For example, an analog front end and/or more parts of a digital front end and/or other parts can be shut down. This helps to reduce the power consumption.

In order to be able to receive data during the ON duration of the DRX cycle, typically, the wireless interface is (re-) transitioned into an active state some time before the beginning of the ON period. This is because the transitioning from the inactive state to the active state requires some time and, furthermore, it is typically required to re-synchronize with the timing reference of the communications network and/or otherwise adapt the wireless interface to be able to receive data.

To re-synchronize—i.e., to maintain synchronization during a further transmission—, the UE can monitor for reference signals (RSs) transmitted by the communications network when attempting to transition the wireless interface to the active state.

It has been found that sometimes the process of monitoring for the RSs is comparably inefficient in that it requires significant time and consumes significant power.

SUMMARY

Accordingly, there is a need for advanced techniques of operating UEs in the disconnected mode using a DRX cycle. In particular, there is a need for advanced techniques of re-acquiring synchronization with a communications network prior to an ON period of the DRX cycle.

This need is met by the features of the independent claims. The features of the dependent claims define embodiments.

According to the techniques described herein, a sporadically-on transmission can be configured for a UE that operates in a disconnected mode. Then, the UE can monitor for the sporadically transmitted RS (Reference Signal) when operating in the disconnected mode. For instance, this monitoring may be in accordance with a DRX cycle. Alternatively or additionally, the UE may monitor for the RS of the sporadically-on transmission prior to or at the beginning of a paging occasion of a paging operation associated with the disconnected mode.

A method of operating a UE includes receiving at least one downlink message. The at least one downlink message is received from a communications network. The at least one downlink message is received when the UE operates in a connected mode, prior to a transition to a disconnected mode. The at least one downlink message includes configuration information. The configuration information is indicative of at least one configuration of a sporadically-on transmission of a RS. The method also includes monitoring for the RS that is sporadically transmitted by the communications network (NW) in accordance with the at least one configuration of the sporadically-on transmission. The UE monitors for the RS when operating in the disconnected mode in accordance with a discontinuous reception cycle. The RS is suitable for maintaining synchronization and the further communication with the communications network during an on-period of the DRX cycle.

A computer program or a computer-program product or a computer-readable storage medium includes program code. The program code can be executed by at least one processor. Executing the program code causes the at least one processor to perform a method of operating a UE. The method includes receiving at least one downlink message. The at least one downlink message is received from a communications network. The at least one downlink message is received when the UE operates in a connected mode, prior to a transition to a disconnected mode. The at least one downlink message includes configuration information. The configuration information is indicative of at least one configuration of a sporadically-on transmission of a RS. The method also includes monitoring for the RS that is sporadically transmitted by the communications NW in accordance with the at least one configuration of the sporadically-on transmission. The UE monitors for the RS when operating in the disconnected mode in accordance with a discontinuous reception cycle. The RS is suitable for maintaining synchronization and the further communication with the communications network during an on-period of the DRX cycle.

A UE includes control circuitry. The control circuitry is configured to receive at least one downlink message from a communications network, when operating in a connected mode prior to a transition to a disconnected mode. The at least one downlink message includes configuration information indicative of at least one configuration of a sporadically-on transmission of a reference signal. The control circuitry is further configured to monitor for the RS sporadically transmitted by the communications network in accordance with the at least one configuration when operating in the disconnected mode in accordance with a discontinuous reception cycle. The RS is suitable for maintaining synchronization in a further communication with the communications network during an on-period of the DRX cycle.

A method of operating an access node of a communications network includes transmitting at least one downlink message to a UE operating in a connected mode. The at least one downlink message includes a configuration information indicative of at least one configuration of a sporadically-on transmission of a RS. The method also includes performing the sporadically-on transmission of the RS when the UE operates in a disconnected mode using a DRX cycle. The RS is suitable for maintaining synchronization in a further communication with the communications network during an on-period of the discontinuous reception cycle.

A computer program or a computer-program product or a computer-readable storage medium includes program code. The program code can be executed by at least one processor. Executing the program code causes the at least one processor to perform a method of operating an access node. The method includes transmitting at least one downlink message to a UE operating in a connected mode. The at least one downlink message includes a configuration information indicative of at least one configuration of a sporadically-on transmission of a RS. The method also includes performing the sporadically-on transmission of the RS when the UE operates in a disconnected mode using a DRX cycle. The RS is suitable for maintaining synchronization in a further communication with the communications network during an on-period of the discontinuous reception cycle.

An access node of a communications network includes a control circuitry. The control circuitry is configured to transmit at least one downlink message to a UE that operates in a connected mode. The at least one downlink message includes a configuration information indicative of at least one configuration of a sporadically-on transmission of a RS. The control circuitry is also configured to perform the sporadically-on transmission of the RS when the UE operates in a disconnected mode using a DRX cycle.

A system includes the access node and the UE as described above. The system can also include one or more core-network nodes that, e.g., configure transmission of paging signals in a paging operation in a paging occasion aligned with the DRX cycle.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
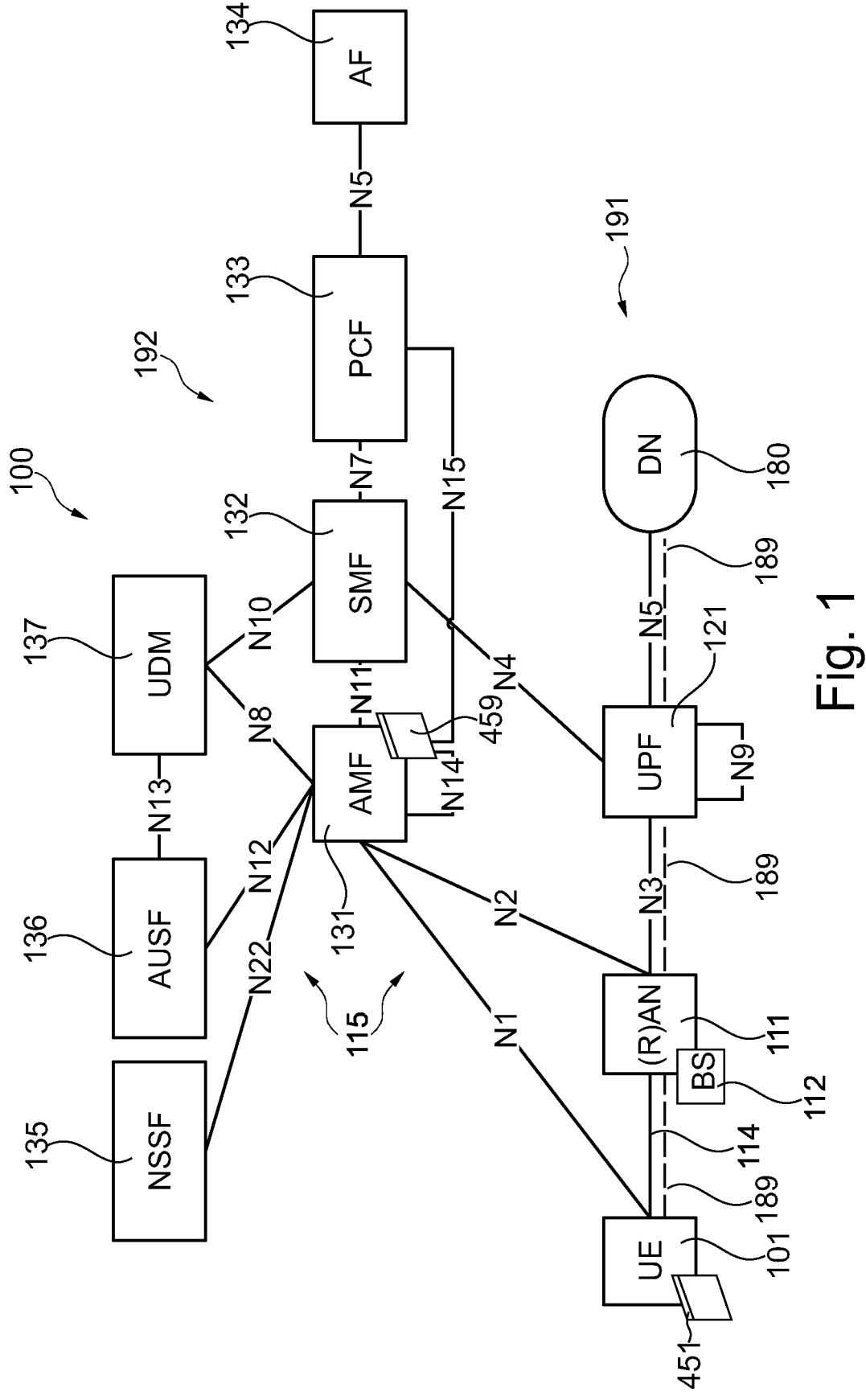
FIG. 1 schematically illustrates a cellular communications network according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various aspects relate to a communication system. For example, the communication system may be implemented by a UE and an access node of a communications network (NW). For example, the access node may be implemented by a base station (BS) of a cellular communications NW (simply, cellular NW hereinafter). Hereinafter, for sake of simplicity various examples will be described in connection with an implementation of the communication system by a UE connectable to a cellular NW. However, similar techniques may be readily employed for other kinds and types of communication systems.

The communication system may include a wireless link between the UE and the BS. Downlink (DL) signals may be transmitted by the BS and received by the UE. Uplink (UL) signals may be transmitted by the UE and received by the BS.

Hereinafter, techniques will be described that facilitate operation of a UE in a disconnected mode. The disconnected mode may restrict connectivity, e.g., in terms of when the UE can receive data and/or in terms of what signals the UE can receive. The disconnected mode can generally enable a UE to shut down partly or fully one or more components of its wireless interface. When a UE operates in the disconnected mode, it is possible that the cellular NW discards certain information associated with the UE, e.g., certain information of the UE context, etc. It would be possible that a UE-specific data connection on the wireless link between the cellular NW and the UE is released; on the other hand, a section of the data connection may be maintained in a core of the communications NW. As a general rule, the UE operating in the disconnected mode can use a DRX cycle, i.e., iteratively switch the wireless interface between an active state and an inactive state (sometimes referred to as sleep state). When in the inactive state, the wireless interface may be unfit to receive data. When switching from the inactive state to the active state, the UE may monitor for a RS. The UE may also monitor for a further transmission, e.g., a paging signal. As a general rule, the disconnected mode can be associated with paging operation. Here, one or more paging signals are transmitted by the communications NW to the UE at a paging occasion (PO). The PO can be time-aligned with the ON period of the DRX cycle.

To receive the paging signal, the UE may require synchronization with the communications NW. To maintain the synchronization, the UE may receive a RS.

A RS generally denotes a signal that has a well-defined transmit property—e-g. amplitude, phase, symbol sequence, and/or precoding, etc.—that is also known to the receiver. Based on a receive (RX) property of the RS—e.g., based on the received amplitude or the received phase of the RS—it is then possible to tune one or more properties of the wireless interface. For instance, a radio-frequency oscillator may be tuned. The RS is suitable/configured to maintain synchronization with the communications NW. It would be possible to sound one or more channels (e.g., pertaining to different spatial streams) on the wireless link.

Then, the UE can attempt to demodulate a further transmission from the communications NW based on the RX property of the RS. For example, the UE may attempt to demodulate a further transmission during or prior to the ON period of the DRX cycle. Alternatively or additionally, the UE can modulate a further transmission to the communications NW based on the RX property of the RS. Thus, as a general rule, the RS can be suitable for maintaining synchronization in a further communication between the UE and the NW.

The further transmission could include UE-initiated UL data, e.g., at least one of a UE mobility indicator, a random-access preamble of a random-access procedure to establish the data connection, or a alive-indicator.

The further transmission could include DL data, e.g., a system information block, a paging signal, a paging area update, etc.

Hereinafter, techniques are described that facilitate efficient—e.g., low-latency and/or energy-efficient and/or low-overhead—synchronization with the cellular NW. The efficient synchronization can be obtained through appropriate strategies for the transmission of the DL RS.

For example, the UE operating in the disconnected mode can be able to utilize RSs that are already available—e.g., for one or more further UEs that may operate in a connected mode. In other words, it would be possible to utilize a transmission of the RS that is configured for the UE and for a least one further UE. Thereby, spectrum utilization can be increased. For instance, the at least one further UE can be in the connected mode.

For example, UE-specific RSs may be used for the UE operating in the idle mode. Such UE-specific RSs may be configured by the cellular NW when a respective UE registers to the cellular NW. As such, such UE-specific RSs may not be always activated, but rather activated on-demand for the respective UE. It is generally possible that multiple UEs share such RS that is activated on-demand when a given one of the multiple UEs enters, e.g., a connected mode.

For example, a sporadically-on transmission of the RS may be used. I.e., a transmission of the RS may be relied upon which is not always-on. This means that the UE will not make an assumption on the presence of the RS on the wireless link unless the sporadically-on transmission is configured for the UE and the UE receives respective signaling from the cellular NW (in contrast to an always-on transmission). A sporadically-on transmission of the RS can be configured by the cellular NW on-demand. The sporadically-on transmission of the RS can be activated and then deactivated again, by the cellular NW. Thus, there may be no indication of a sporadically-on transmission in a broadcasted information block. The sporadically-on transmission of the RS may use time-frequency resources in a time-frequency resource grid that are specifically allocated when configuring the sporadically-on transmission. A respective configuration can be indicative of such time-frequency resources. This may be different to an always-on transmission where respective re-occurring resources may be statically allocated, e.g., at certain reserved sections of a subframe of the transmission protocol used for communicating on the wireless link.

As a general rule, it would be possible that the RS of the sporadically-on transmission is indicative of a cell identity of the cell of the cellular NW. The RS of the sporadically-on transmission can be sequence-based. For instance, a symbol sequence of, e.g., a Zadoff-Chu sequence or a maximum-length sequence may be used. Scrambling and/or interleaving may be sued. The sporadically-on transmission may map the RS to multiple subcarriers within an Orthogonal Frequency Division Multiplexing (OFDM) symbol.

Any example implementation of the sporadically-on transmission of the RS may rely on a Channel State Information RS (CSI-RS) or a tracking RS (TRS). In contrast, an always-on transmission of a RS may rely on, e.g., one or more of a primary synchronization signal (PSS), a secondary synchronization signal (SSS), or a cell-specific reference signal. The PSS and/or the SSS signal can be included in a repeatedly broadcasted synchronization signal block (SSB) that also includes other components such as a physical broadcast channel, carrying an information block including cell-specific information.

The sporadically-on transmission of the RS may define a repetitive transmission scheme. This may be associated with respect to a corresponding repetition rate of the RS. A timing schedule of the RS may be specified. A sequence design of the TRS may be specified.

Because the always-on transmission of a respective further RS is always available, the sporadically-on transmission of the RS is contemporaneous (i.e., available at the same time) with the always-on transmission. Thus, in principle, the UE may select to attempt to receive (monitor) the further RS of the always-on transmission or the RS of the sporadically-on transmission, or both.

As a general rule, it would be possible that a repetition rate of the sporadically-on transmission of the RS (e.g., TRS) is larger than a repetition rate of the always-on transmission of a further RS (e.g., PSS). This may have the benefit that a latency until reception of the RS of the sporadically-on transmission is comparably short. Thus, a time-to-synchronization can be reduced when the UE monitors for the RS of the sporadically-on transmission when operating in the disconnected mode.

As a further general rule, it would be possible that a bandwidth of the sporadically-on transmission of the RS is larger than a bandwidth of the always-on transmission of the further RS. This means that the sporadically-on transmission may cover a broader frequency range of compared to the always-on transmission. Wider bandwidth RS transmission would enable fine frequency/time synchronization. For instance, multiple RSs may be scattered across the broader bandwidth, or a single RS may occupy a comparably large bandwidth.

Various techniques are based on the finding that because a sporadically-on transmission of the RS may be used by the UE operating in the disconnected mode using the DRX cycle, the UE—once transitioning the wireless interface back from the inactive state to the active state in preparation of an ON period of the DRX cycle—may require some additional information regarding whether the sporadically-on transmission of the RS is currently configured by the communications NW or not (in particular in contrast to an always-on transmission of the RS for which the UE may simply begin monitoring, because it is always active and the UE makes the respective assumption without dedicated DL signaling from the cellular NW).

According to various examples described herein, techniques are provided that facilitate a corresponding exchange of configuration information indicative of at least one configuration of the sporadically-on transmission of the RS between the communications NW and the UE.

For example, prior to the transition to the disconnected mode, while the UE (still) operates in the connected mode, the communications NW may transmit at least one DL message that includes the configuration information of the sporadically-on transmission and the UE can receive the at least one DL message. Then, after transition to RRC-Idle or RRC-Inactive mode, (so called disconnected mode) when operating in the disconnected mode in accordance with the respective DRX cycle, the UE can monitor for the RS that is sporadically transmitted by the communications NW in accordance with the at least one configuration. The RS is suitable for maintaining synchronization in a further communication between the UE and the communications NW.

As a general rule, The further communication could include UL signals and/or DL signals. The further FIG. 1 schematically illustrates a cellular NW 100. The example of FIG. 1 illustrates the cellular NW 100 according to the 3GPP 5G architecture. Details of the 3GPP 5G architecture are described in 3GPP TS 23.501, version 15.3.0 (2017 September). While FIG. 1 and further parts of the following description illustrate techniques in the 3GPP 5G framework of a cellular NW, similar techniques may be readily applied to other communication protocols. Examples include 3GPP LTE 4G—e.g., in the MTC or NB-IoT framework—and even non-cellular wireless systems, e.g., an IEEE Wi-Fi technology.

In the scenario of FIG. 1, a UE 101 is connectable to the cellular NW 100. For example, the UE 101 may be one of the following: a cellular phone; a smart phone; an IoT device; a MTC device; a sensor; an actuator; etc. The UE 101 has a respective identity 451, e.g., a subscriber identity.

The UE 101 is connectable to a core NW (CN) 115 of the cellular NW 100 via a RAN 111, typically formed by one or more BSs 112 (only a single BS 112 is illustrated in FIG. 1 for sake of simplicity). A wireless link 114 is established between the RAN 111—specifically between one or more of the BSs 112 of the RAN 111—and the UE 101. To perform channel sounding, it is possible to that the BS 112 provides one or more transmissions of one or more RSs. For example, the BS 112 can provide an always-on transmission of a first RS. The BS 112 can also provide a sporadically-on transmission of a second RS. For this, the BS 112 can configure the respective sporadically-on transmission for one or more UEs that are connected or have been connected to the respective cell of the cellular NW 100, e.g., by maintaining a respective registry.

The wireless link 114 implements a time-frequency resource grid. Typically, OFDM is used: here, a carrier includes multiple subcarriers. The subcarriers (in frequency domain) and the symbols (in time domain) then define time-frequency resource elements of the time-frequency resource grid. Thereby, a protocol time base is defined, e.g., by the duration of frames and subframes including multiple symbols and the start and stop positions of the frames and subframes. Different time-frequency resource elements can be allocated to different logical channels of the wireless link 114. Examples include: Physical DL Shared Channel (PDSCH); Physical DL Control Channel (PDCCH); Physical Uplink Shared Channel (PUSCH); Physical Uplink Control Channel (PUCCH); channels for random access; etc.

The CN 115 includes a user plane (UP) 191 and a control plane (CP) 192. Application data is typically routed via the UP 191. For this, there is provided a UP function (UPF) 121. The UPF 121 may implement router functionality. Application data may pass through one or more UPFs 121. In the scenario of FIG. 1, the UPF 121 acts as a gateway towards a data NW 180, e.g., the Internet or a Local Area NW. Application data can be communicated between the UE 101 and one or more servers on the data NW 180.

The cellular NW 100 also includes a mobility-control node, here implemented by an Access and Mobility Management Function (AMF) 131 and a Session Management Function (SMF) 132.

The cellular NW 100 further includes a Policy Control Function (PCF) 133; an Application Function (AF) 134; a NW Slice Selection Function (NSSF) 134; an Authentication Server Function (AUSF) 136; and a Unified Data Management (UDM) 137. FIG. 1 also illustrates the protocol reference points N1-N22 between these nodes.

The AMF 131 provides one or more of the following functionalities: connection management sometimes also referred to as registration management; NAS termination for communication between the CN 115 and the UE 101; connection management; reachability management; mobility management; connection authentication; and connection authorization. For example, the AMF 131 controls CN-initiated paging of the UE 101, if the respective UE 101 operates in the idle mode. The AMF 131 may trigger transmission of paging signals to the UE 101; this may be time-aligned with paging occasions (POs). The timing of the POs can be determined based on the UE identity 451. After UE registration to the NW, the AMF 131 creates a UE context 459 and keeps this UE context, at least as long as the UE 101 is registered to the NW. The UE context 459 can hold one or more identities of the UE 101, e.g., temporary identities used for paging as described herein.

A data connection 189 is established by the SMF 132 if the respective UE 101 operates in a connected mode. The data connection 189 is characterized by UE subscription information hosted by the UDM 137. To keep track of the current mode of the UE 101, the AMF 131 sets the UE 101 to CM-CONNECTED or CM-IDLE. During CM-CONNECTED, a non-access stratum (NAS) connection is maintained between the UE 101 and the AMF 131. The NAS connection implements an example of a mobility control connection. The NAS connection may be set up in response to paging of the UE 101.

The SMF 132 provides one or more of the following functionalities: session management including session establishment, modify and release, including bearers set up of UP bearers between the RAN 111 and the UPF 121; selection and control of UPFs; configuring of traffic steering; roaming functionality; termination of at least parts of NAS messages; etc. As such, the AMF 131 and the SMF 132 both implement CP mobility management needed to support a moving UE.

The data connection 189 is established between the UE 101 and the RAN 111 and on to the UP 191 of the CN 115 and towards the DN 180. For example, a connection with the Internet or another packet data NW can be established. To establish the data connection 189, i.e., to connect to the cellular NW 100, it is possible that the respective UE 101 performs a random access (RACH) procedure, e.g., in response to reception of a paging signal. This establishes at least a RAN-part of the data connection 189. A server of the DN 180 may host a service for which payload data is communicated via the data connection 189. The data connection 189 may include one or more bearers such as a dedicated bearer or a default bearer. The data connection 189 may be defined on the RRC layer, e.g., generally Layer 3 of the OSI model.

Figure 2:
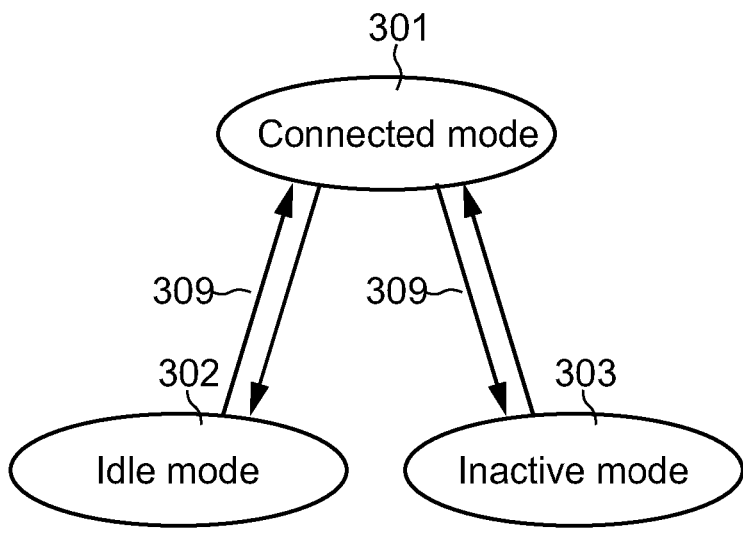
FIG. 2 schematically illustrates multiple modes in which a UE connectable to the cellular communications network can operate according to various examples.

FIG. 2 schematically illustrates aspects with respect to multiple operational modes 301-303 in which a UE can operate.

The data connection 189 is established in the connected mode 301. In particular, a RAN-part of the data connection 189 is established in the connected mode 301. Data can be communicated between the UE 101 and the BS 112 using PDSCH, PDCCH, PUSCH, PUCCH. RRC control messages can be communicated on PDSCH and/or PUSCH. It is possible to use connected-mode DRX. The connected mode 301 can be implemented by the 3GPP RRC connected mode.

FIG. 2 also illustrates to disconnected modes 302-303. A first disconnected mode is the idle mode 302, e.g., implemented by 3GPP RRC idle mode. A second disconnected mode is the inactive mode 303, e.g., implemented by 3GPP RRC inactive mode. Typically, the inactive mode 303 is transparent to the CN 115; while the idle mode 302 may be signaled to the CN 115. Thus, the UE context 459 may be maintained at the CN 115 when the UE 101 operates in the inactive mode 303.

FIG. 2 also illustrates aspects with respect to the transitions 309 between the various modes 301-303. For instance, to trigger the transition 309 from the connected mode 301 to one of the disconnected modes 302-303, a connection deactivation message can be communicated, e.g., using RRC control signaling on the PDSCH or PUSCH. This may be a connection inactivate control message for the transition 309 to the inactive mode 303; or a connection release message for the transition 309 to the idle mode 302. The connection release message triggers release of the data connection 189. The connection deactivation message can include an information element that carries additional data.

The transition 309 from the idle mode 302 or the inactive mode 303 to the connected mode 301 includes a RACH procedure. The RACH procedure may be triggered by paging signals, e.g., a paging indicator on PDCCH and a paging message on PDSCH. In the inactive mode 303, paging can be triggered by the RAN; while in the idle mode 302 the paging is triggered by the CN.

The paging signals are transmitted at paging occasions. The timing of the paging occasions is determined depending on the identity 451 of the UE 101. The UE 101 can configure a DRX cycle in accordance with the timing of the paging occasions (POs). In particular, the UE 101 can control its wireless interface such that it is in the active state and ready to receive data—e.g., by blind decoding PDCCH for the paging indicator—at the start of the ON period of the DRX cycle. Details with respect to the operation of the UE 101 using the DRX cycle are illustrated in FIG. 3.

Figure 3:
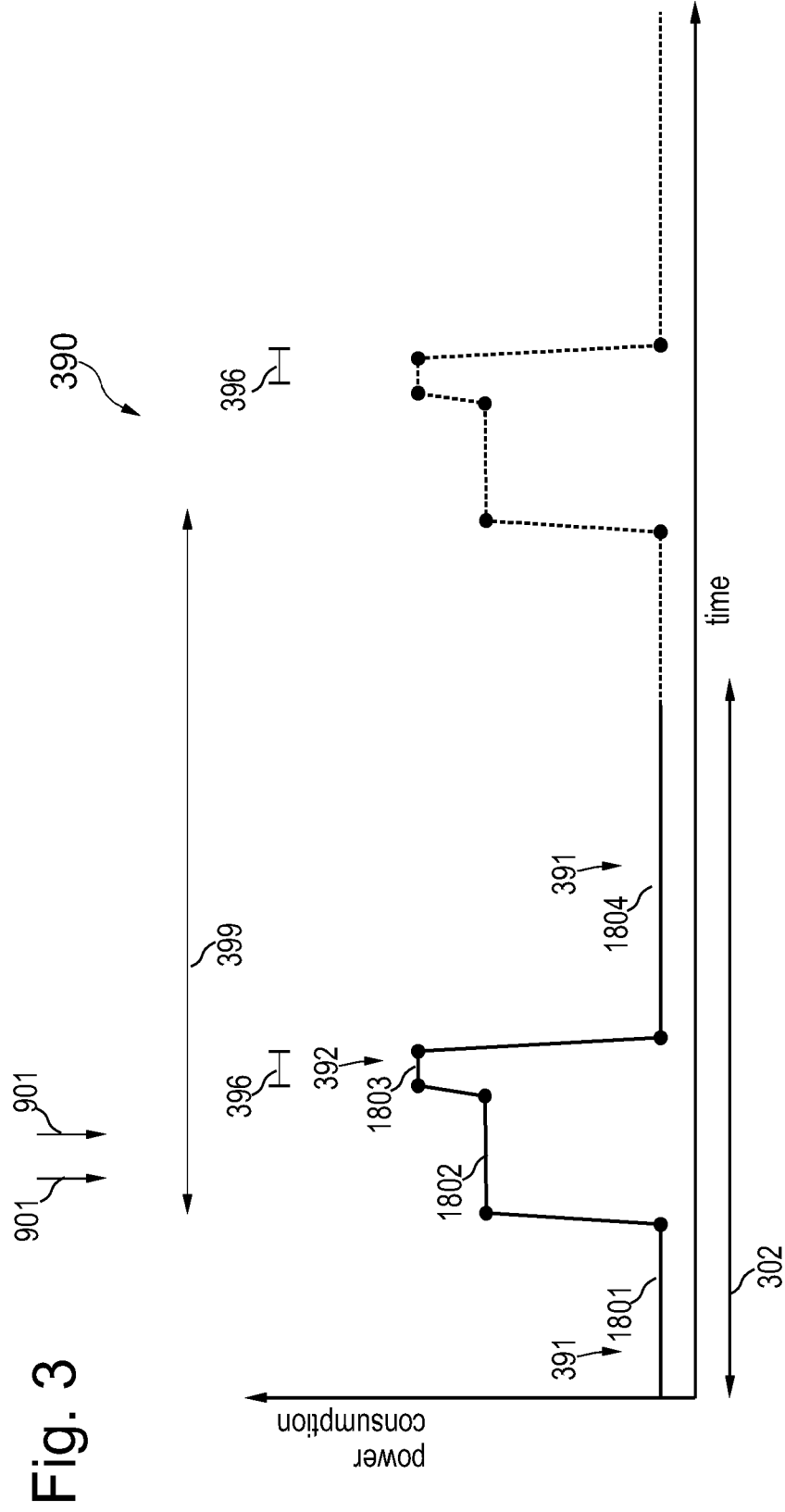
FIG. 3 schematically illustrates aspects with respect to a DRX cycle that can be used by a UE when operating in a disconnected mode according to various examples.

FIG. 3 schematically illustrates aspects with respect to a DRX cycle 390. The DRX cycle 390 can be used by the UE 101 in one or both of the disconnected modes 302-303, or even in the connected mode 301. FIG. 3 illustrates activity of the various components of the wireless interface of the UE 101 as a function of time, to implement a DRX cycle 390. More specifically, FIG. 3 illustrates the activity of the various components of the wireless interface by indicating the UE power consumption.

When using the DRX cycle 390, the UE 101 periodically transitions a modem of its wireless interface between an inactive state 391 (during time periods 1801 and 1804 in FIG. 3) and an active state 392 (during time period 1803 in FIG. 3). The time periods 1801 and 1804 correspond to Off periods of the DRX cycle 390; and the time period 1803 corresponds to an ON period of the DRX cycle 390. The time period 1803 of the active state 392 is time-aligned with a PO 396 during which the cellular NW 100 can send the paging signal(s). FIG. 3 illustrates a corresponding cycle duration 399 of the DRX cycle 390, i.e., the periodicity or duration of individual periods of the DRX cycle 390.

The timing of the PO 396 is given (for the example of 3GPP NR) by (i) the System Frame Number (SFN) and (ii) the subframe within this frame and (iii) the UE_ID, which is derived from the respective identity 451 of the UE 101.

The UE 101 cannot receive paging signals when operating the modem in the inactive state 391; for example, an analog front end and/or a digital front end of the modem may be powered down. For example, amplifiers and analog-to-digital converters may be switched off. For example, decoding digital blocks may be switched off. The UE hardware is entering the inactive state 391 when it is possible to save power. When the UE hardware is in the inactive state 391, one or more clocks may be turned off, all radio blocks and most modem blocks may be turned off, just minimum activity with a low frequency (RTC) clock to start the platform when it is time for the next PO 396 may be maintained. Accordingly, the inactive state 391 is associated with a comparably small power consumption.

When operating the modem in the active state 392, the UE 101 can monitor for paging signals. The various hardware components of the modem of the wireless interface are powered up and operating. For example, the UE 101 can perform blind decoding of the PDCCH to detect a paging indicator. The active state 392 is accordingly associated with a comparably high power consumption.

As illustrated in FIG. 3, there is a time period 1802 required to transition the UE 101 from the inactive state 391 to the active state 392 (wake-up time). This transition can require frequency and timing to be (re-)adjusted and the modem to be started to be able to receive paging signals. The UE 101 can receive one or more RSs 901 during the time period 1802, to (re-)synchronize.

In the scenario of FIG. 3, the UE 101 does not receive a paging signal during the time period 1803 (paging occasion); and, accordingly, transitions back into the inactive state 391 during the time period 1804. The procedure is repeated after the periodicity 399 of the DRX cycle 390 (as illustrated by the dashed line of FIG. 3). Once a paging indicator is detected, the UE 101 next reads a paging message on the PDSCH or a paging channel (PCH) (not illustrated). Based on the paging message, the data connection 189 can be set up.

As will be appreciated from FIG. 3, the time period 1802 is significant. I.e., there is significant power consumption at the UE 101 to facilitate synchronization with the cellular NW 100 prior to the PO 396. Hereinafter, strategies are described that facilitate shortening the time period 1802 by fast synchronization. In particular, strategies are described that facilitate such shortening of the time period 1802 by providing a transmission of a RS 901 that facilitates fast and/or fine synchronization during the time period 1802 prior to the PO 396.

Figure 4:
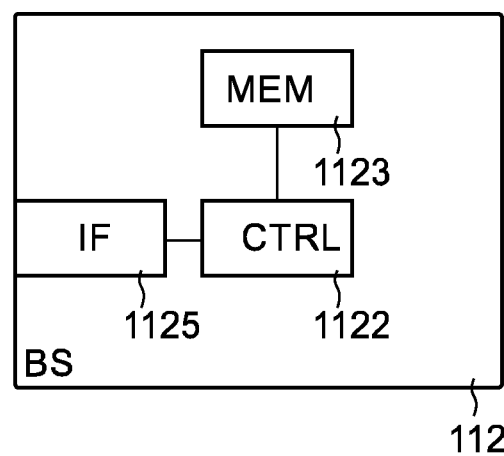
FIG. 4 schematically illustrates a base station according to various examples.

FIG. 4 schematically illustrates the BS 112. The BS 112 includes control circuitry 1122 that can load program code from a memory 1123. The BS 112 also includes an interface 1125 that can be used to communicate on the wireless link 114 with the UE 101 or nodes of the CN 115 of the cellular NW 100. As such, the interface 1125 can include an analog front end and a digital front end, as well as antenna ports, etc., for communicating on the wireless link 114. The control circuitry 1122 can load program code from the memory 1123 and execute the program code. Upon executing the program code, the control circuitry 1122 can perform techniques as described herein, e.g.: configuring and providing a transmission of a RS, e.g., a sporadically-on transmission and/or an always-on transmission; receiving an indication of a capability of the UE 101 to monitor for a RS 901 of a sporadically-on transmission when operating in a disconnected mode 302-303; providing a configuration of a transmission of a RS to the UE 101; etc.

Figure 5:
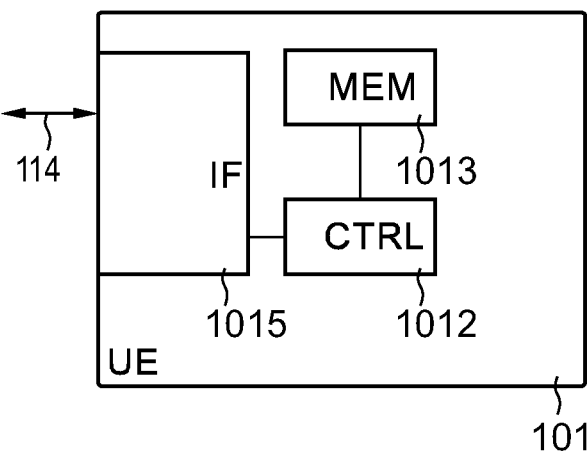
FIG. 5 schematically illustrates a UE according to various examples.

FIG. 5 schematically illustrates the UE 101. The UE 101 includes control circuitry 1012 that can load program code from the memory 1013. The UE 101 also includes a wireless interface 1015 that can be used to communicate on the wireless link 114 with the BS 112 of the cellular NW 100. As such, the wireless interface 1015 can include an analog front end and a digital front end, as well as antenna ports, etc. The control circuitry 1012 can load program code from the memory 1013 and execute the program code. Upon executing the program code, the control circuitry 1012 can perform techniques as described herein, e.g.: monitoring for a RS, e.g., when operating in a disconnected mode 302-303; transmitting an indication of a capability to the cellular NW 100 to monitor for a RS of a sporadically-on transmission when operating in a disconnected mode 302-303; obtaining a configuration of a transmission of a RS from the cellular NW 100 and monitoring for the RS in accordance with the configuration; controlling the wireless interface 1015 to switch between the inactive state 391 and the active state 392; operating in one of the modes 301-303; etc.

Figure 6:
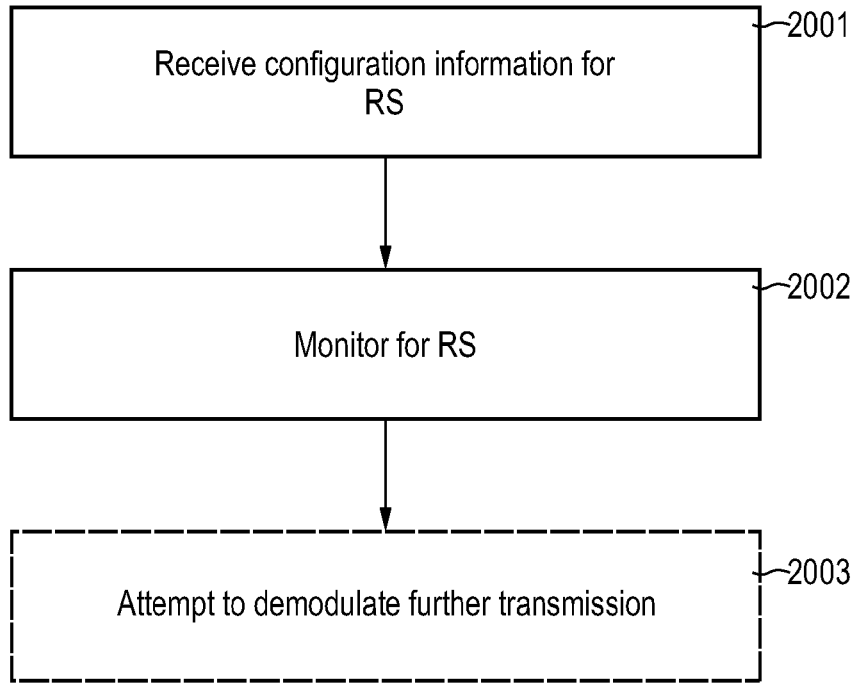
FIG. 6 is a flowchart of a method according to various examples.

FIG. 6 is a flowchart of a method according to various examples. The method of FIG. 6 may be executed by a UE. For example, the method of FIG. 6 could be executed by the UE 101. More specifically, it would be possible that the method of FIG. 6 is executed by the control circuitry 1012 of the UE 101 upon loading program code from the memory 1013.

At box 2001, configuration information for a possible sporadically-on transmission of RS (when the UE is in disconnected mode) is received—e.g., upon request by the UE or otherwise triggered, e.g., by an indication of a respective capability of the UE to receive the RS of the sporadically-on transmission when operating in a disconnected mode 302-303. The sporadically-on transmission is not guaranteed, but separate activation may be required.

One or more DL messages can be received that include the configuration information. Thus, the configuration information can be spread across multiple DL message in some scenarios.

For example, the one or more DL messages can include a data connection deactivation message that triggers the transition from the connected mode to the disconnected mode 302-303.

The configuration information can be received while operating in a connected mode, e.g., in the connected mode 301 or FIG. 2. Thus, higher-layer control signaling along an established control channel or data channel of a data connection can be used to deliver the one or more DL messages.

At least one of the one or more DL messages may be received a predetermined time before the transition to the disconnected mode 302-303. I.e., there may be a time offset between receiving the at least one of the DL messages and the transition to the disconnected mode 302-303 that is defined on or before said receiving of the at least one of the one or more DL messages.

For example, at least one of the one or more DL messages may be received within 10 ms or within 100 ms or within 1 s prior to the transition to the disconnected mode 302-303; this can correspond to the predetermined time.

For example, one or more 3GPP RRC control messages may be used to provide the configuration information. The RRC control messages may be communicated on the PDSCH for a 3GPP scenario, while the UE is in RRC connected mode.

The configuration information can be indicative of at least one configuration of the sporadically-on transmission of the RS. Thus, in some examples, it would be possible that the configuration information indicates multiple configurations of the sporadically-on transmission of the RS, e.g., having various properties such as time-frequency resources, repetition rate, or timing schedule. This would give the UE the possibility to select among the multiple configurations.

The configuration information indicative of the at least one configuration of the sporadically-on transmission of the RS can also be valid for the UE upon a transition from the connected mode to a disconnected mode—e.g., from the connected mode 301 to the idle mode 302 the inactive mode 303, cf. FIG. 2; accordingly, the configuration information may be labelled prospective configuration information.

As a general rule, there are various options available for implementing the configuration information. Some of these options are illustrated in TAB. 1 below.

TABLE 1

| Implementation variants for the configuration information indicative of at least one configuration of a sporadically-on transmission of a RS | | |
|---|---|---|
| Variant | Implementation of configuration information | Explanation |
| A | Flag | For example, the flag—e.g., a 1-bit signaling—can be indicative of whether the UE can continue to use a previously provided at least one |

TABLE 1-continued

Implementation variants for the configuration information indicative of
at least one configuration of a sporadically-on transmission of a RS

| Variant | Implementation of configuration information | Explanation |
|---------|--------------------------------------------|-------------|
|  |  | configuration of the sporadically-on transmission also when operating in the disconnected mode. For example, the previously-provided configuration can be provided when operating in the connected mode, e.g., for a given bandwidth part. |
| B | Multi-bit information element | It would also be possible that the configuration information includes a multi-bit information element that indicates multiple properties of the at least one configuration. For example, multiple configurations may be provided, e.g., for multiple bandwidth parts and/or for multiple UEs or groups of UEs. The UE could receive a bitmap of the selected configuration to be used in the idle mode. Example properties include: time resources allocated to the sporadically-on transmission; frequency resources allocated to the sporadically-on transmission; space resources allocated to the sporadically-on transmission; a quasi-co-location (QCL) indicator with respect to, e.g., an always-on RS or a preceding transmission while still operating in a connected mode; a repetition rate or timing schedule of the sporadically-on transmission |
| C | Relative or absolute indication | For example, in some scenarios, the configuration information may relatively define at least a part of the at least one configuration with respect to a further configuration of an always-on RS. A quasi-co-location indicator could be used. A time offset and/or a frequency offset with respect to the respective always-on transmission of the always-on RS may be defined. In other scenarios, the indication may be provided in absolute terms, i.e., without referencing to another configuration. |
| D | One configuration or multiple configurations for multiple bandwidth parts | In some examples, multiple configurations of the sporadically-on transmission may be provided. In a case in which bandwidth parts (BWPs) are used, it would be possible to provide multiple configurations, i.e., for the multiple BWPs. Then, for instance, the UE can attempt to demodulated the further transmission on the respective BWP. |
| E | One configuration or multiple configurations for multiple groups of UE's | In some examples, a single configuration may be provided that is applicable to multiple UEs, e.g., operating in the disconnected mode contemporaneously or irrespective of the particular mode in which the UEs operate. In other examples, multiple configurations may be provided, wherein different configurations are applicable to different groups of UEs. For instance, each UE may select an appropriate configuration, e.g., based on group classification information the parametrized the association of the UEs with the groups. |

The QCL indicator, see TAB. 1, variant B or C, can help to monitor for the sporadically-on transmission of the RS. For example, a receive operation for antenna array of a wireless interface of the UE can be selected based on the QCL indicator. I.e., amplitude and phase of the various antenna elements of the antenna array can be appropriately selected. This is sometimes also referred to as monitoring using a given receive beam, i.e., a spatial characteristic of the reception sensitivity. Furthermore, this is sometimes also referred to as monitoring using a given channel property, such as Doppler spread/shift, average delay, delay spread, and/or average gain. In particular, it is possible to select the receive operation using a QCL assumption with a preceding transmission. For instance, the preceding transmission may include a transmission during connected mode, prior to the transition to the sleep mode, e.g., on a PDSCH shared channel. Alternatively or additionally, the preceding transmission may include a transmission of a further RS, e.g., a SSB. As a general rule, two antenna ports are said to be quasi co-located if radio-channel properties of the channel over which a symbol on one antenna port is conveyed can be inferred from the channel over which a symbol on the other antenna port is conveyed. The radio channel properties which may be common across the antenna ports can be selected from: Doppler spread/shift, average delay, delay spread, average gain, and/or spatial receiver parameters. Thus, the QCL assumption may require the transmitter, e.g., the BS, to use the same or QCL antenna ports for the sporadically-on transmission of the RS and the preceding transmission. As a general rule, it would be possible that the QCL assumption is fixedly configured, e.g., in accordance with a communications standard (e.g., instead of signaling it).

As a general rule, such variants are illustrated in TAB. 1 may also be combined with each other. For instance, as in the variant A of TAB. 1, it would be possible to provide—e.g., as part of a data connection deactivation message that triggers the transition from the connected mode to the disconnected mode—a flag indicating that a previously provided full configuration of the sporadically-on transmission may be reused also during idle mode (variant A+B). For further illustration, it would be conceivable that there are multiple configurations for multiple BWPs, as well as for multiple groups (variant D+E).

After performing the transition from the connected mode to the disconnected mode 302-303, at box 2002, the UE monitors for the possible RS, i.e., listens to the wireless link 114 and attempts to receive in a configured allocation. This is in accordance with the at least one configuration of the sporadically-on transmission of the RS, of box 2001.

The RS is suitable for maintaining synchronization in a further communication with the communications NW, e.g., during an ON period of the DRX cycle. This means that the RS can have a sequence-based structure, e.g., similar to PSS and/or SSS.

For instance, as illustrated in TAB. 1, the appropriate time-frequency resources may be selected based on the configuration information. The appropriate BWP and/or group of UEs may be selected and, based on the selection, the appropriate configuration out of multiple configurations can be selected.

Next, at optional box 2003, an attempt to demodulate a further transmission is made, based on a least one receive property of the RS, if received based on the monitoring at box 2002. For instance, an analogue receiver chain may be tuned based on time/frequency synchronization derived a phase of the received RS. Gain control could be used.

By using the at least one configuration of the sporadically-on transmission of the RS at box 2002, the time-to-synchronization can be reduced. Thus, referring to the example of FIG. 3, the time period 1802 may be shortened. UE power consumption can be reduced.

Figure 7:
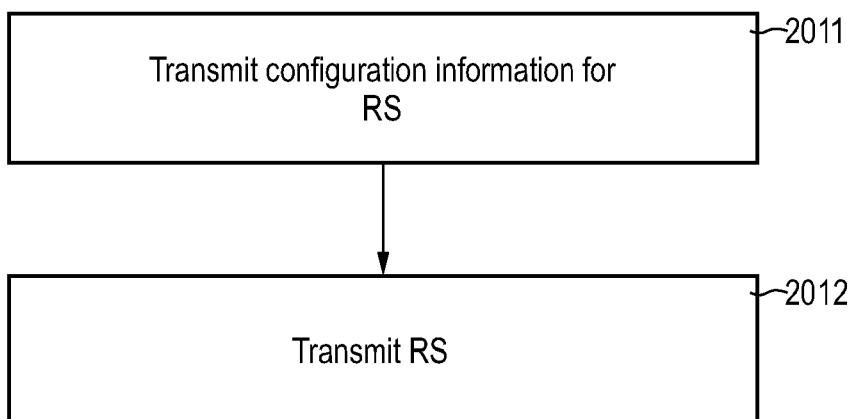
FIG. 7 is a flowchart of a method according to various examples.

FIG. 7 is a flowchart of a method according to various examples. The method of FIG. 7 could be executed by an access node of a communications NW. For instance, the method of FIG. 7 could be executed by a BS of a cellular NW. For instance, the method of FIG. 7 could be executed by the BS 112 of the cellular NW 100 (cf. FIG. 1). More specifically, it would be possible that the method of FIG. 7 is executed by the control circuitry 1122 of the BS 112 upon loading program code from the memory 1123.

The method of FIG. 7 is generally interrelated with the method of FIG. 6. For example, the method of FIG. 7 can be executed aligned and inter-worked with the method of FIG. 6.

At box 2011, the access node transmits configuration information for a sporadically-on transmission of RS. For instance, one or more DL control messages including the configuration information can be transmitted. The configuration information can be transmitted to a UE; in particular, the UE can be operating in a connected mode (cf. FIG. 2: connected mode 301). Box 2011 is interrelated with box 2001 (cf. FIG. 6).

It would be possible that the configuration information for the sporadically-on transmission of the RS is included in a connection deactivation message that triggers a transition from the connected mode to a disconnected mode (cf. FIG.

2, disconnected modes 302-303). For instance, the transmission of the connection deactivation message could be triggered by a core NW node of the communications NW.

At box 2012, the access node provides the sporadically-on transmission of the RS, i.e., transmits the RS in accordance with the time-frequency resources, the timing, and/or repetition rate of the sporadically-on transmission. The sporadically-on transmission thus, generally, defines the framework of the transmitting of the RS. This is in accordance with the configuration information of box 2011. Box 2012 is inter-related with box 2002.

Any further transmission that may be provided can then be demodulated by the receiver of the sporadically-on transmission of the RS based on a receive property of the RS.

Figure 8:
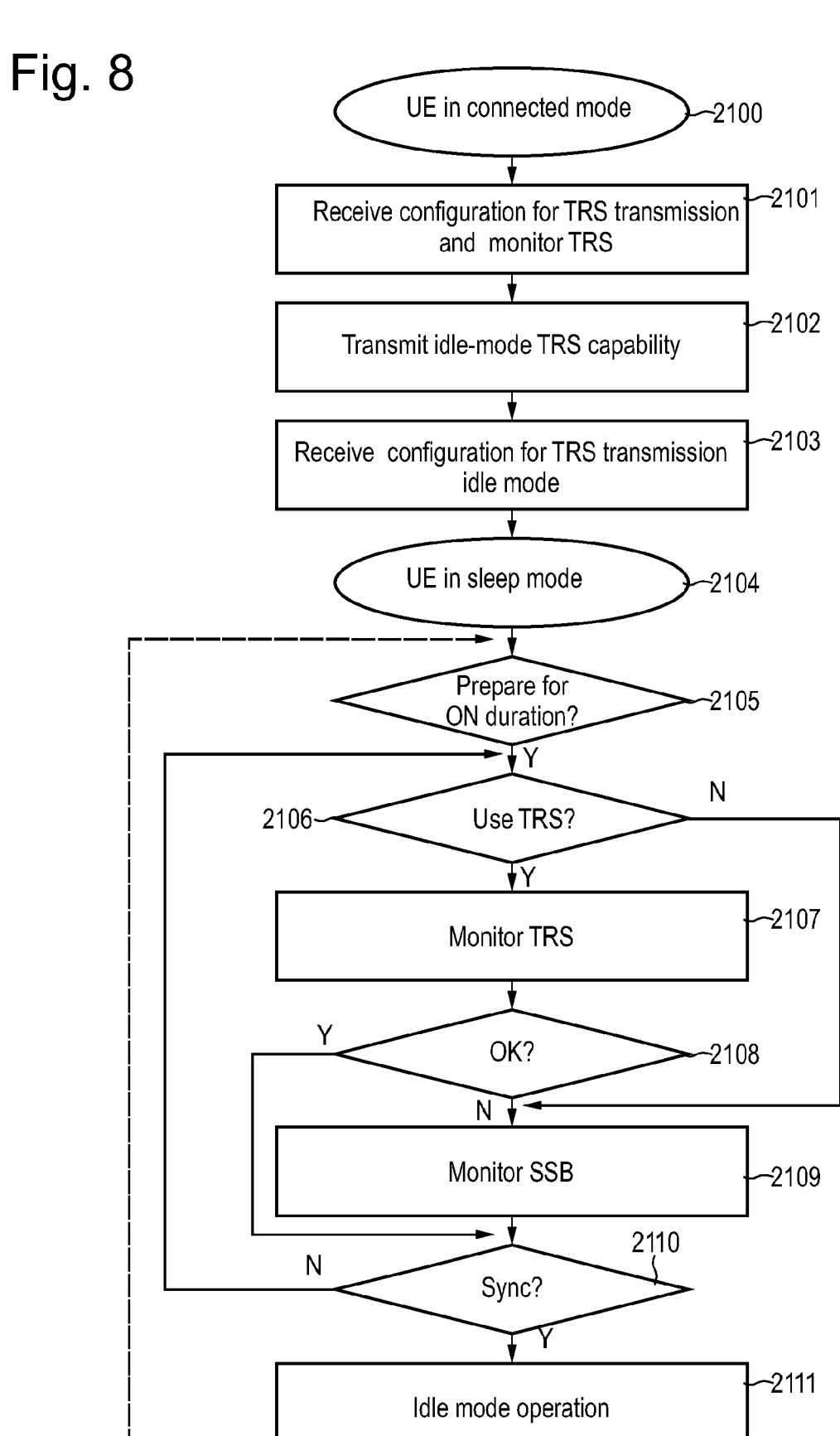
FIG. 8 is a flowchart of a method according to various examples.

FIG. 8 is a flowchart of a method according to various examples. For example, the method of FIG. 8 may be a more specific implementation of the more general method of FIG. 6. The method of FIG. 8 may be executed by a UE. Hereinafter, various examples will be described in connection with the method of FIG. 8 being executed by the UE 101. Further, various examples are described in the context of using the TRS of a corresponding sporadically-on transmission. See, e.g., 3GPP TS 38.211 V15.8.0 (2019 December), section 7.4.1.5.

At box 2100, the UE 101 operates in the RRC connected mode 301. I.e., the data connection 189 is established. The UE 101 is connected through a BS 112 of a serving cell of the cellular NW 100.

At box 2101, the UE 101 is configured with a sporadically-on transmission of the TRS by the cellular NW 100. For this, the UE 101 receives a DL message including configuration information indicative of at least one configuration of the TRS transmission. Each TRS configuration can—e.g., amongst other properties—specify time-frequency resources and timing schedule of the sporadically-on transmission (cf. TAB. 1, variant B). Multiple TRS configurations may be provided (cf. TAB. 1, variants D-E).

The UE 101 then monitors for the TRS, while operating in the connected mode 101. This is in accordance with the TRS configuration. The TRS help to maintain synchronization with the cellular NW 100.

At box 2102, the UE 101 transmits an UL message to the cellular NW 100. The UL message is indicative of a capability of the UE 101 to monitor for the TRS when operating in the idle mode 302 or the inactive mode 303, e.g., using the same TRS configuration as used for monitoring at box 2101 or another configuration.

Thereby, the UE can indicate whether it supports processing of TRSs of the sporadically-on TRS transmission when operating in a disconnected mode 302-303.

At box 2103, the UE 101 receives a DL message that includes (further) configuration information indicative of a configuration of the sporadically-on transmission of the TRS, to be used when operating in the idle mode. For instance, this could be a one-bit flag (cf. TAB. 1, variant A) that indicates that the previously provided configuration of the sporadically-on transmission of the TRS used at box 2101 can also be used by the UE upon executing the transition to the disconnected mode 302-303. In another scenario, a new full TRS configuration (or multiple full TRSs configurations) are provided, cf. TAB. 1, variant B.

Then, the UE executes the transition to one of the disconnected mode 302-303 and, at box 2104, operates in the respective disconnected mode 302-303. This is in accordance with the DRX cycle 390. For instance, the transition to the disconnected mode 302-303 may be triggered by a data connection deactivation message received from the cellular NW 100 and the data connection deactivation message may include the the one-bit flag discussed above in connection with box 2103.

At box 2105, it is checked whether preparation for an ON period of the DRX cycle 390 is required. The ON period can be aligned with a PO. In particular, this can involve a respective lead time to power up components of the wireless interface 1015, as previously discussed in connection with FIG. 3. Also, a time period 1802 is used to monitor for the TRS.

Then, in case of an upcoming ON period of the DRX cycle 390, the UE 101 continues operation at box 2106 (otherwise, the wireless interface 1015 remains in the inactive state 391).

At box 2106, the UE 101 determines whether one or more predefined criteria are met.

The one or more predefined criteria can enable the UE 101—that is, in principle, in possession of the TRS configuration for the disconnected mode 302-303—to forgo the TRS monitoring.

When executing box 2106, the connectivity of the UE 101—i.e., the ability to communicate with the cellular NW 100—is limited, if present at all. This is because there is no or only inaccurate synchronization. This has been explained in connection with FIG. 3: time period 1802. As such, the one or more predefined criteria can be such decision criteria that are primarily UE-centric. Thus, the UE 101 can be in a position to determine whether the one or more predefined criteria are met without receiving respective data from the cellular NW 100.

Then, monitoring for the TRS is selectively executed depending on whether the one or more predefined criteria are met. This helps to avoid spending energy to process unqualified TRS that would, e.g., produce an unreliable estimate for the timing reference, or for synchronization.

As a general rule, there are various options available to implement such one or more predefined criteria. Some of these options are described in connection with TAB. 2 below.

TABLE 2

| | options for predefined criteria for monitoring for a sporadically-on transmission of RSs at the UE | |
|---|---|---|
| Variant | Decision criterion | Remarks |
| A | Received signal strength threshold | For example, the UE 101 may only attempt to receive TRS if the received signal strength is above a certain received signal strength threshold. For instance, it would be possible that the received signal strength is determined based on monitoring a further RS, e.g., a PSS or SSS of an always-on transmission, received during the same time period 1802 of the same period of the DRX 390. In another example, it may be possible to rely on a stored value of the received signal strength from a previous ON period of the DRX cycle. |
| B | Mobility status threshold | The mobility of the UE 101 may be compared with the mobility status threshold. For example, would be possible that the UE only attempts to receive TRS when the UE is static or has a comparably low mobility. There are various options for determining the mobility: some options may rely on UE sensors, e.g., a accelerometer, etc. Other options may rely on NW-assisted positioning or satellite positioning. Also, see variant C of TAB. 2. |
| C | Cell identity | For instance, the UE 101 may check the cell identity of a cell of the communications NW, e.g., based on a received information block in the SSB. The SSB can be received during the time period 1802 of the same period of the DRX cycle 390. For instance, based on a cell identity, the UE can determine a mobility. For instance, the UE can check whether it has moved to another cell since the last ON period of the DRX cycle. For instance, the UE could check whether it has moved to another cell since last operating in the connected mode. For instance, the UE may only attempt to receive the TRS if it is still within coverage of the last serving cell while still operating in the connected mode 301. |
| D | Timing threshold | The one or more predefined criteria may include a timing threshold for an elapsed time since receiving the configuration information for the sporadically-on transmission, i.e., the time elapsed since, e.g., executing box 2103. The timing threshold could also be defined as the time since the transition 309 to the disconnected mode 302-303. Thus, the cellular NW 100 may configure a TRS for the UE 101 with a certain validity time duration. Then, the corresponding timing threshold is exceeded, the UE 101 may not assume that the TRS is still actively configured for the UE 101. |

TABLE 2-continued options for predefined criteria for monitoring for a sporadically-on transmission of RSs at the UE

| Variant | Decision criterion | Remarks |
|---|---|---|
| E | Cycle duration threshold | The one or more predefined criteria may include a cycle duration threshold for the cycle duration 399 of the DRX cycle 390. For instance, only if the cycle duration 399 is below the cycle duration threshold may the UE 101 attempt to monitor for the TRS. This is based on the finding that monitoring for the sporadically-on transmission of a RSs can be mainly beneficial for you is configured with a short cycle duration of the DRX cycle. This is because the relative power consumption for re-synchronization is comparably large in such a scenario. |
| F | Threshold traffic load | For instance, the one or more predefined criteria may include a threshold traffic load. Only UEs having a comparably high data traffic may be configured to monitor for the TRS. |
| E | Too many failed reception attempts of TRS in the current cycle of the DRX cycle | For instance, the UE 101 may in successive iterations of box 2106 attempt to receive a TRS. If too many reception attempts fail, then the UE 101 may fallback to synchronization based on SSB or another fallback mechanism. For example, a respective threshold of N failed reception attempts may be configured. Thus, generally speaking, the success rate of said monitoring for the TRS may be considered. |
| F | Too many failed reception attempts of TRS in a previous cycle of the DRX cycle | For instance, if the UE 101 has attempted to receive TRS in preparation of previous ON periods of the DRX cycle, but has failed to establish synchronization with the cellular NW in the previous cycle of the DRX cycle, then, also for subsequent periods of the DRX cycle, TRS monitoring may be disabled. Thus, generally speaking, the success rate of said monitoring for the TRS may be considered. |

As a general rule, it would be possible to combine the various scenarios according to TAB. 2. For instance, a multiple decision criteria can be configured. It would be possible to configure a hierarchy between decision criteria, such that certain lower-hierarchy decision criteria need not be met, if higher-hierarchy decision criteria are met.

As a general rule, it would be possible that the one or more decision criteria are partly or fully configured by the NW, or are partly or fully configured by the UE. The one or more decision criteria may be fixed, e.g., according to a standard. When being configured by the communications NW, it would be possible to provide the respective decision criteria configuration information as part of the same DL message that carries the configuration information for the sporadically-on transmission of the RS (cf. TAB. 1).

In case the check at box 2106 yields that the UE 101 is to monitor for the TRS of the sporadically-on transmission, the method commences at box 2107.

At box 2107 the UE 101 monitors for the TRS. Box 2107 thus corresponds to box 2002 of FIG. 6.

As a general rule, it would be possible that the UE 101 has received configuration information indicative of multiple configurations of the sporadically-on transmission of the TRS (cf. TAB. 1, variants D and E). Then, at box 2107, the UE 101 can select the appropriate configuration from the multiple configurations. For instance, multiple configurations may pertain to multiple BWPs and/or multiple groups of UEs. Then, the UE could check with which part it is operating on and/or to which group it belongs and select the appropriate configuration.

At box 2108, the UE checks whether a TRS has been successfully received at box 2107. In the affirmative, the method commences at box 2110.

At box 2110, the UE checks whether a sufficiently accurate synchronization with the cellular NW 100 has already been established. In a simple scenario, this check may be based on a number of receives TRSs and/or PSSs and/or further RSs. If synchronization is completed, then conventional idle mode operation can commence at box 2111. This may include, e.g., receiving one or more paging signals, e.g., a paging indicator on the PDCCH by blind decoding and optionally a paging message on the PDSCH based on the paging indicator. One or more further periods of the DRX cycle 390 may also be triggered as indicated by the dashed line in FIG. 8. Alternatively, it would also be possible that the UE 101 performs a transition to the connected mode 101—in such a case, the UE 101 may request or be configured with an updated configuration of the sporadically-on transmission of the TRS, or be provided with an indication that the configuration used while operating in the disconnected mode 302-303 can be continued to be used.

On the other hand, if the synchronization with the cellular NW 100 is not (fully) completed or a successful at box 2110, then, a further iteration of box 2106 can be triggered.

There is also the case in which the decision at box 2106 indicates that (further) monitoring for the TRS is disabled, because one or more decision criteria for TRS monitoring are not met (cf. TAB. 2). Then, the method commences directly at box 2109, where the UE 101 monitors for SSB and can establish synchronization based on the PSS included in the SSB.

In a scenario in which receive beamforming is implemented at the UE, it would be possible that the same spatial receive filter is employed for monitoring for the TRS at box 2107 and for monitoring for the SSB at box 2109.

In the scenario FIG. 8, fallback to SSB-based synchronization is also implemented in case the monitoring for the TRS at box 2107 is judged to be unsuccessful at box 2108. In this case, subsequent to box 2108, box 2109 is executed.

As will be appreciated, in the scenario FIG. 8, the UE 101 not only monitors for the TRS transmitted using the sporadically-on transmission (at box 2107), but also monitors for the always-on PSS included in the SSB at box 2109. Then, synchronization can be established on, both, the receive property of the TRS, as well as the receive property of the PSS and the subsequent transmission during idle mode operation at box 2111; and any demodulation of, e.g., PDCCH, can based on the receive properties of, both, the TRS as well as the PSS.

In the scenario of FIG. 8, monitoring for the SSB at box 2109 is selectively executed if reception of the TRS fails at box 2107. There can be various reasons for reception of the TRS failing at box 2107: For example, the RAN 111 may stop the TRS transmission and UE 101 is still in disconnected mode 302-303. Then, the UE may not be aware that the TRS is no longer available—e.g., due to limited connectivity in the disconnected mode 302-303. The RAN 111 may terminate the TRS transmission as another targeted UE operated in connected mode 301 (the TRS transmission may be initially configured for the targeted UE) changes its state to disconnected mode 302-303. In this case, UE 101 fails in TRS reception at box 2107. There can be other reasons for failed reception of the TRS, e.g., path loss, low signal-to-noise, etc.

Such a conditional execution of the monitoring for the SSB depending on failed reception of the TRS is generally optional. Other variants of combining TRS-based synchronization with PSS-based synchronization are conceivable. For instance, in a first variant, it would be conceivable that the UE 101 always attempts to monitor for TRS and PSS/SSS. In another variant, it would be possible that the UE 101, initially, monitors for TRS for a coarse synchronization with the cellular NW 100 and, secondarily, monitors for the SSB for a fine synchronization with the cellular NW 100 that takes into account the coarse synchronization. In yet another variant, it would be possible that the UE 101 initially receives the SSB and performs a coarse synchronization based on the PSS/SSS. If required, the UE 101 can then continue to receive the TRS for fine synchronization. Thereby, a 2-step synchronization can be implemented where it is possible that the first stage is implemented by the PSS/SSS and the second stage is implemented by the TRS, or vice versa. Thereby, demodulation accuracy can be increased.

Figure 9:
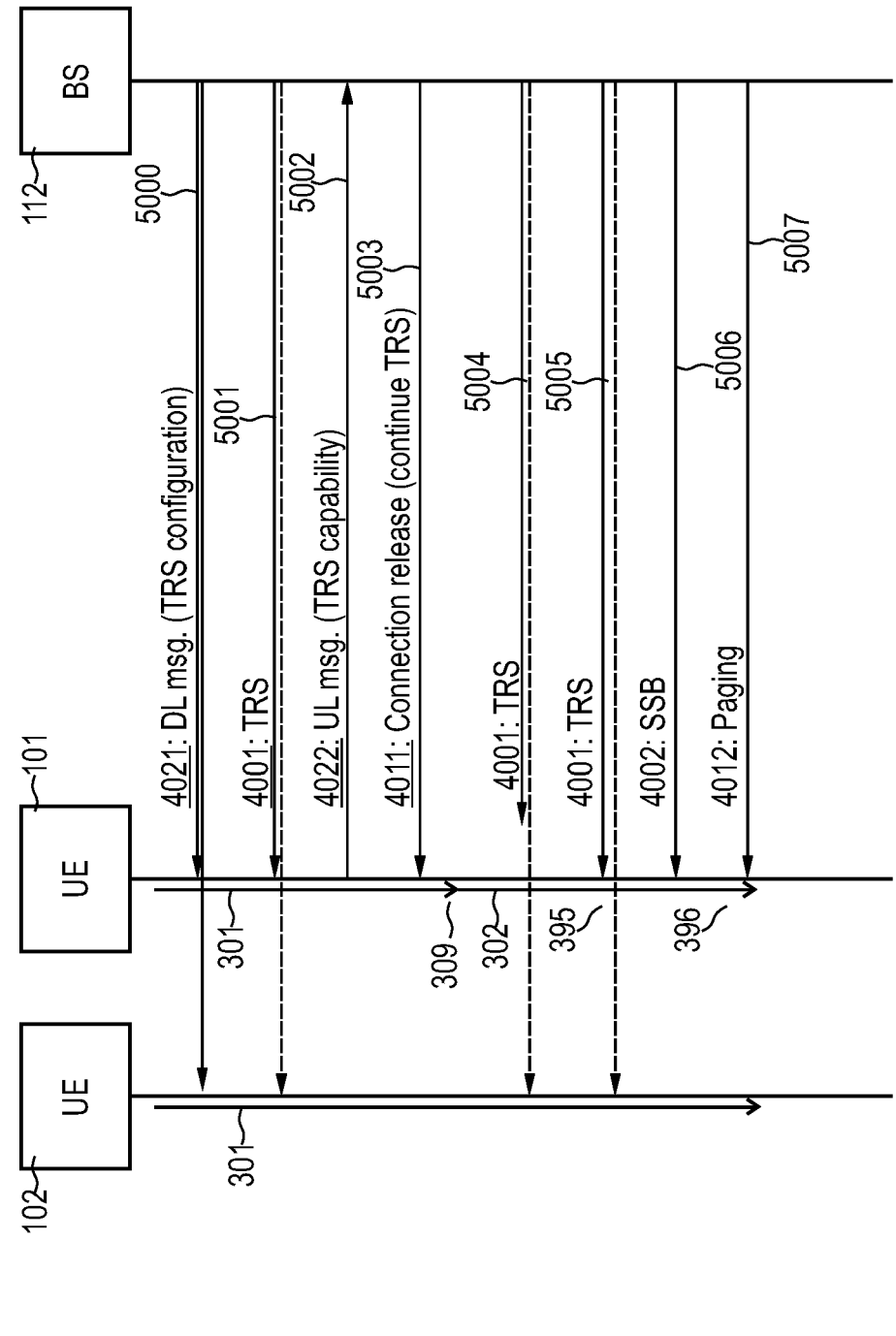
FIG. 9 is a signaling diagram of communication between the base station and multiple UEs according to various examples.

FIG. 9 is a signaling diagram of communication between the BS 112 and the UE 101. FIG. 9 also illustrates communication between the BS 112 and a further UE 102. The further UE 102 continuously operates in the connected mode 301, while the UE 101—as has been explained in connection with, e.g., FIG. 8—performs a transition 309 from operation in the connected mode 301 to operation in the disconnected mode 302-303 (here in FIG. 9: idle mode 302).

At 5000, the BS 112 transmits DL control messages 4021 to, both, the UE 101, as well as the UE 102. For example, RRC signaling may be used. The DL control message 4021 is indicative of a configuration of a sporadically-on transmission of TRS. For example, the DL control message 4021 could include multiple configurations for multiple BWPs. The DL control message 4021 could indicate the respective time-frequency resources for the transmission of the TRS. The DL control message 4021 could indicate a repetition rate of a timing schedule of the sporadically-on transmission of the TRS. See TAB. 1, variant B.

While in the scenario of FIG. 9 the DL control messages 4021 are transmitted essentially contemporaneously to, both, the UE 101 as well as the UE 102, in other scenarios, there may be a time offset; for example, the sporadically-on transmission of the TRS may be first configured for a first UE and then after a time gap configured for a second UE. Another option would be that the UE 101 and the UE 102, while respectively operating in the connected mode 301, can be configured with different transmissions of the TRS, e.g., having different repetition rates, timing schedules, and/or sequence designs of the TRS. Then, when preparing for the transition 309 to the disconnected mode 302, it would be possible that the UE 101 is configured with the sporadically-on transmission of the TRS initially configured for the UE 102.

At 5001, the UE 101, as well as the UE 102 can then monitor for the TRS 4001 based on the TRS configuration of the sporadically-on transmission of the TRS 4001 provided at 5000.

Based on a receive property of the TRS, the UE 101, as well as the UE 102 can demodulate the PDSCH of the PDCCH (not illustrated in FIG. 9). Channel sounding can be implemented. Beamforming may be adjusted.

At 5002, the UE 101 transmits an UL message to the BS 112. The UL message 4022 is indicative of a capability of the UE 101 to monitor for the TRS when operating in the disconnected mode 302-303. More specifically, it would be possible that the UL message 4022 is indicative of the capability of the UE 101 to monitor for the TRS using the specific TRS configuration provided at 5000. The UE 101 could also request another TRS configuration. For example, the UL message 4022 could be a RRC connection release request message indicating the intention of the UE 101 to transition to the disconnected mode 302-303. The UL message 4022 could also be another RRC control message, e.g., transmitted upon initial access.

Based on the capability of the UE 101 to monitor for the TRS when operating in the disconnected mode 302-303, the BS 112 can then configure the respective sporadically-on transmission of the TRS 4001 for the UE 101 operating in the disconnected mode 302-303. For example, the BS 112 could maintain a corresponding log of UEs 101-102 for which the respective sporadically-on transmission of the TRS 4001 is currently configured. For instance, the corresponding log could include time durations or validity periods for the respective sporadically-on transmissions.

At 5003, the BS 112 transmits a connection deactivation message 4011 that triggers the transition 309 from the connected mode 301 to the disconnected mode 302-303 (specifically, in the illustrated scenario FIG. 9, the idle mode 302). The connection deactivation message 4011 includes an indicator indicative of the UE 101 being authorized to continue monitoring for the TRS 4001 in accordance with the TRS configuration provided at 5000 when operating in the idle mode 302; this may be a one bit flag (cf. TAB. 1, variant A).

Subsequently, the UE 101 performance to transition to the idle mode 302. The data connection 189 between the UE 101 of the RAN 111 is released.

Then, the BS 112 continues to transmit the TRS 4001 of the sporadically-on transmission using the TRS configuration provided at 5000. For example, the BS 112 transmits the TRS 4001 at 5004. This TRS 4001 transmitted by the BS 112 at 5004 is received by the UE 102 that continues to operate in the connected mode 301, but is not received by the UE 101. At the time of 5004, the UE 101 operates its interface in the inactive state 391. Thus, the UE 101 does not attempt to receive the TRS 4001 transmitted at 5004. This is different at 5005. Again, the BS 112 transmits the TRS 4001 at 5005 using the TRS configuration of the respective sporadically-on transmission of the TRS 4001. This time, the UE 101—in preparation of an ON period of the DRX cycle 390—monitors for the TRS 4001 and successfully receives the TRS 4001. In the scenario FIG. 9, at 5006, the UE 101 also receives the SSB 4002 transmitted by the BS 112, but this is generally optional. For example, in case sufficient accuracy of the synchronization can be established based on a receive property of the TRS 4001 alone, then the UE 101 can skip monitoring for the SSB 4002 or more specifically the PSS/SSS. This facilitates power saving. Further, while in the scenario FIG. 9, the UE 101 first receives the TRS 4001 at 5005 and only later on receives the SSB 4002 at 5006, in other scenarios, the UE 101 may first receive the SSB 4002 and then later on receive the TRS 4001. In such a scenario, a two-step synchronization can be implemented, i.e., a coarse synchronization based on the PSS/SSS included in the SSB 4002 and then a fine synchronization based on the TRS 4001. This reduces the need to receive multiple SSBs 4002 to obtain an accurate synchronization, thereby reducing power consumption.

Based on the amplitude and/or phase and/or timing of the TRS 4001 and the PSS in the SSB 4002, the UE 101 can then establish synchronization with the BS 112. Alternatively, or additionally, gain control may be implemented. Then, the UE 101 can continue with idle mode operation and, in the illustrated scenario FIG. 9, receives one or more paging signals 4012 at 5007. For instance, the UE 101 may perform blind decoding of PDCCH in order to receive a paging indicator at 5007, based on the establish synchronisation. As such, the UE 101 monitors, at 5005, for the TRS 4001 prior to the respective paging occasion at which the one or more paging signals 4012 and received at 5007 (cf. FIG. 3: time duration: 1802).

As will be appreciated from FIG. 9, the BS 112 configures the sporadically-on transmission of the TRS 4001 for the UE 101 operating in the idle mode 302, as well as for the UE 102 operating in the connected mode 301. As such, it can be said that the UE 101 re-uses the sporadically-on transmission of the TRS 4001 anyway required for a connected-mode-operation of the UE 102. In other examples, it would be possible that the sporadically-on transmission of the TRS 4001 is exclusively configured for the UE 101 operating in the idle mode 302, e.g., in case the UE 101 is released to the idle mode 302.

As a general rule, it would be possible that the BS 112 primarily configures the sporadically-on transmission of the TRS 4001 for one or more first UEs operating in the connected mode 301 and secondarily configures the sporadically-on transmission for one or more second UEs operating in the disconnected mode 302, 303. Then, upon detecting that the one or more first UEs operating in the connected mode 301 have transitioned to the disconnected mode 302, 303 and/or have left the coverage of the BS 112 and/or upon detecting another trigger event associated with the one or more first UEs, the BS 112 can deactivate the sporadically-on transmission, e.g., irrespective of whether the one or more second UEs still operate in the disconnected mode 302, 303 and/or in coverage of the BS 112. It would be possible that the BS 112 considers a elapsed time since configuring of the one or more second UEs, e.g., a validity of the respective configuration in this decision making.

Figure 10:
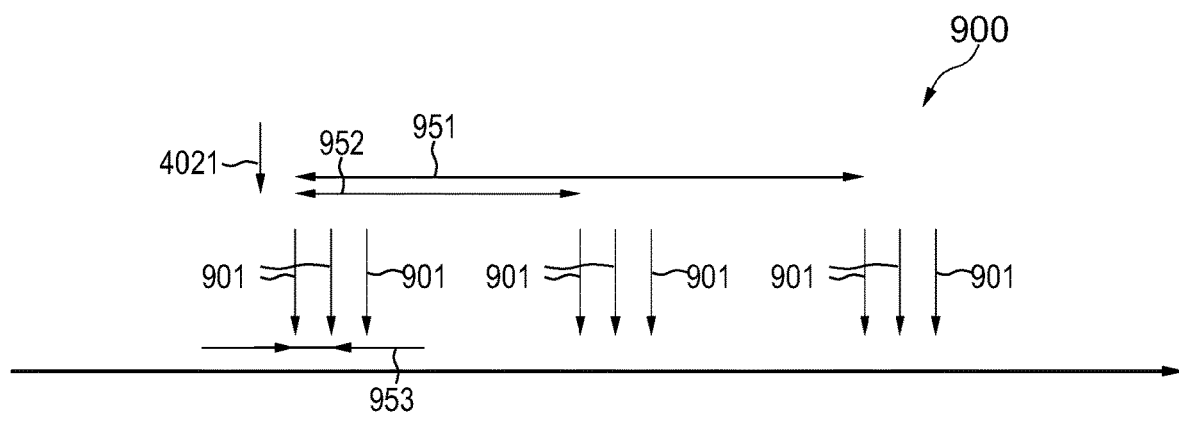
FIG. 10 schematically illustrates an always-on transmission of a reference signal according to various examples.

FIG. 10 illustrates aspects with respect to a sporadically-on transmission 900 of a RS 901. The various examples described herein can use such techniques as described in connection with the sporadically-on transmission 900 in FIG. 10.

The sporadically-on transmission 900 of the RS 901 is characterized by multiple properties of a corresponding configuration. For instance, a timing schedule 952 and a repetition rate 953 of transmitting the RS 901 can be associated with the sporadically-on transmission 900. Also illustrated in FIG. 10 is a scenario in which the sporadically-on transmission 900 has a certain validity duration 951. The sporadically-on transmission 900 can also be characterized by a set of time-frequency resources allocated to the RS 901.

As illustrated in FIG. 10, there is a control message 4021 that includes configuration information indicative of the configuration of the sporadically-on transmission 900. Different to an always-on transmission of a RS, prior to receiving the configuration information included in the message 4021, the UE 101 cannot make an assumption on the presence of the sporadically-on transmission.

Summarizing, above, various techniques have been described that facilitate configuring a sporadically-on transmission of a RS for a UE that operates in the disconnected mode. For example, a sporadically-on transmission of a TRS can be configured for a UE that operates in the disconnected mode.

Such techniques can be generally combined with conventional always-on transmission of RSs, e.g., an always-on transmission of PSS and SSS included in a SSB. For example, the UE can combine the reception of the TRS and the reception of the SSB or even replace or reduce the amount of the SSB reception with the TRS reception. For example, it may be possible to rely solely on TRS when the UE is comparably static (i.e., has long mobility) and has a strong receive signal strength. Thereby, the power consumption at the UE can be reduced while not compromising the demodulation performance, e.g., when attempting to modulate the PDCCH in an ON period of the DRX cycle.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, various examples have been described in connection with scenarios in which the RS of the sporadically-on transmission is implemented by a TRS. Respective techniques may be readily applied to other kinds and types of RS provided through a sporadically-on transmission.

Further illustration, various examples have been described in which a RS of a sporadically-on transmission is received, wherein the RS is suitable for maintaining synchronization with the communications NW in a further transmission from the communications NW to the UE. However, similar techniques may be readily applied to an UL communication from the UE to the communications NW; also in such examples it is helpful to use the RS that is suitable for maintaining the synchronization.

For further illustration, while various examples have been explained in connection with an implementation of the disconnected mode by an idle mode or an inactive mode, other scenarios can include other implementations of the disconnected mode, i.e., other power-saving modes.

The invention claimed is:

1. A method of operating a wireless communication device, the method comprising:

when operating in a connected mode, prior to a transition to a disconnected mode: receiving, from a communications network, at least one downlink message comprising configuration information indicative of at least one configuration of a sporadically-on transmission of a reference signal, wherein the at least one configuration includes at least time frequency resources allocated to the sporadically-on transmission of the reference signal, when operating in the disconnected mode in accordance with a discontinuous reception cycle: monitoring for the reference signal sporadically transmitted by the communications network in accordance with the at least one configuration, wherein the reference signal is configured for use in maintaining synchronization in a further communication with the communications network during an on-period of the discontinuous reception cycle.

2. The method of claim 1, wherein the configuration information comprises a flag that is indicative of whether the wireless communication device can continue to use the at least one configuration after completing the transition to the disconnected mode.

3. The method of claim 1, wherein the configuration information comprises a multi-bit information element indicative of multiple properties of the at least one configuration.

4. The method of claim 1, wherein the at least one configuration further comprises at least one of space resources allocated to the sporadically-on transmission of the reference signal, a quasi-co-location indicator with respect to a further reference signal, a repetition rate, or a timing schedule of the sporadically-on transmission of the reference signal.

5. The method of claim 1, wherein the configuration information relatively defines at least a part of the at least one configuration with respect to a further configuration of a further transmission of a further reference signal.

6. The method of claim 1, wherein the at least one downlink message comprises a data connection deactivation message triggering the transition to the disconnected mode.

7. The method of claim 1, wherein the sporadically-on transmission of the reference signal is configured for at least one further wireless communication device.

8. The method of claim 7, wherein the at least one further wireless communication device is in the connected mode.

9. The method of claim 1, wherein the at least one configuration comprises multiple configurations associated with multiple groups of wireless communication devices.

10. The method of claim 1, wherein the at least one configuration comprises multiple configurations for multiple bandwidth parts.

11. The method of claim 1, further comprising:

when operating in the connected mode: transmitting an uplink message to the communications network, the uplink message being indicative of a capability of the wireless communication device to monitor for the reference signal in accordance with the at least one configuration when operating in the disconnected mode.

12. The method of claim 1, further comprising:

when operating in the disconnected mode: determining whether one or more-predefined criteria are met, wherein said monitoring for the reference signal is selectively executed depending on whether the one or more predefined criteria are met.

13. The method of claim 12, wherein the one or more predefined criteria comprise a received signal strength threshold for a received signal strength determined based on monitoring for a further reference signal transmitted by the cellular network in accordance with an always-on transmission.

14. The method of claim 12, wherein the one or more predefined criteria comprise a mobility status threshold for a mobility of the wireless communication device.

15. The method of claim 12, wherein the one or more predefined criteria comprise a cell identity of a cell of the communications network in coverage of the wireless communication device.

16. The method of claim 12, wherein the one or more predefined criteria comprise one or more of: a timing threshold for an elapsed time since receiving the configuration information; a cycle duration threshold for a cycle duration of the discontinuous reception cycle; a threshold traffic load of communication between the wireless communication device and the communications network; or a success rate of said monitoring of the reference signal.

17. The method of claim 1, further comprising:

when operating in the disconnected mode in accordance with the discontinuous reception cycle: monitoring for an always-on reference signal transmitted in accordance with an always-on transmission, wherein the further transmission is attempted to be demodulated further based on a further receive property of the always-on reference signal.

18. The method of claim 17, wherein said monitoring for the always-on reference signal is selectively executed if reception of the reference signal fails.

19. A method of operating an access node of a communications network, the method comprising:

transmitting, to a wireless communication device operating in a connected mode, at least one downlink message comprising a configuration information indicative of at least one configuration of a sporadically-on transmission of a reference signal, wherein the at least one configuration includes at least time frequency resources allocated to the sporadically-on transmission of the reference signal;

when the wireless communication device operates in the connected mode: receiving an uplink message from the wireless communication device, the uplink message being indicative of a capability of the wireless communication device to monitor for the reference signal in accordance with the at least one configuration when operating in the disconnected mode;

selectively configuring the sporadically-on transmission of the reference signal for the wireless communication device operating in the disconnected mode based on the capability of the wireless communication device; and performing the sporadically-on transmission of the reference signal when the wireless communication device operates in a disconnected mode using a discontinuous reception cycle.

* * * * *